United States Patent
Song et al.

(10) Patent No.: US 9,311,063 B2
(45) Date of Patent: Apr. 12, 2016

(54) METHOD FOR GENERATING USER INTERFACE USING UNIFIED DEVELOPMENT ENVIRONMENT

(71) Applicant: TOBESOFT CO., LTD, Seoul (KR)

(72) Inventors: Hwajun Song, Seoul (KR); Benjamin Cho, Seoul (KR)

(73) Assignee: TOBESOFT CO., LTD., Seoul (KR)

( * ) Notice: Subject to any disclaimer, the term of this patent is extended or adjusted under 35 U.S.C. 154(b) by 0 days.

(21) Appl. No.: 14/065,619

(22) Filed: Oct. 29, 2013

(65) Prior Publication Data

US 2014/0149964 A1 May 29, 2014

(30) Foreign Application Priority Data

Nov. 29, 2012 (KR) .................. 10-2012-0136872

(51) Int. Cl.
*G06F 9/44* (2006.01)
(52) U.S. Cl.
CPC ....................................... *G06F 8/38* (2013.01)
(58) Field of Classification Search
CPC ............................................... G06F 9/44
USPC ......................................... 717/106, 107, 109
See application file for complete search history.

(56) References Cited

U.S. PATENT DOCUMENTS

| | | | |
|---|---|---|---|
| 5,844,554 A * | 12/1998 | Geller et al. | 715/744 |
| 6,922,200 B1 * | 7/2005 | Marques | 345/619 |
| 7,174,361 B1 * | 2/2007 | Paas | 709/203 |
| 8,166,165 B1 * | 4/2012 | Meketa et al. | 709/225 |
| 2005/0193380 A1 * | 9/2005 | Vitanov et al. | 717/143 |
| 2007/0074202 A1 * | 3/2007 | McMahan et al. | 717/174 |
| 2007/0192362 A1 * | 8/2007 | Caballero et al. | 707/104.1 |
| 2008/0244424 A1 * | 10/2008 | Fukuda et al. | 715/763 |
| 2008/0270562 A1 * | 10/2008 | Jin et al. | 709/208 |
| 2012/0005603 A1 * | 1/2012 | Chinuki et al. | 715/762 |

FOREIGN PATENT DOCUMENTS

| | | |
|---|---|---|
| JP | 2003216427 A | 7/2003 |
| JP | 2005515552 A | 5/2005 |
| KR | 10-2011-0060419 A | 6/2011 |

* cited by examiner

*Primary Examiner* — Chat Do
*Assistant Examiner* — Jae Jeon
(74) *Attorney, Agent, or Firm* — Young & Thompson

(57) ABSTRACT

A method for generating a User Interface (UI) using a unified development environment is disclosed. The method includes providing a UI development menu by a unified development menu provider, the UI development menu being used to develop a UI for configuring and controlling an application screen, generating a source script for configuring and controlling an application screen to generate a unified component independent of execution environments, upon receipt of a user input through the UI development menu, and generating a unified component independent of execution environments using the source script and a pre-installed or downloaded element source matching with a current execution environment by a component generator of a user device, upon execution of an application.

14 Claims, 9 Drawing Sheets

METHOD FOR GENERATING USER INTERFACE USING UNIFIED DEVELOPMENT ENVIRONMENT

CROSS REFERENCE TO RELATED APPLICATIONS

This application claims the benefit of Korean Patent Application No. 10-2012-0136872, filed on Nov. 29, 2012, which is hereby incorporated by reference as if fully set forth herein.

BACKGROUND OF THE INVENTION

1. Field of the Invention

The present invention relates to a method for generating a User Interface (UI) using a unified development environment, and more particularly, to a method for generating a UI using a unified development environment, which enables implementation of an application UI developed in the unified development environment in various execution environments.

2. Discussion of the Related Art

Various application execution environments have emerged. Therefore, as an application development environment is provided on an execution environment basis, a developer should find out every development environment and get knowledge of the development environment.

For example, if a UI is to be generated for a Rich Internet Application (RIA) or a Web application, a developer should produce the RIA or the Web application using separate development environments and should get knowledge of each development environment.

However, considering that more and more development environments are created, the developer faces limits in finding out every development environment and learning about the development environment.

Moreover, if an application is to be modified in the phase of running the application, the application should be modified and distributed individually in each development environment because the application was created in different development environments. As a result, development cost and running cost are increased.

SUMMARY OF THE INVENTION

Accordingly, the present invention is directed to a method for generating a user interface using a unified development environment that substantially obviates one or more problems due to limitations and disadvantages of the related art.

An object of the present invention is to provide a method for generating a User Interface (UI) using a unified development environment, which enables execution of an application developed in the unified development environment in various execution environments and facilitates easy modification and maintenance of the application UI.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for generating a UI using a unified development environment includes providing a UI development menu by a unified development menu provider, the UI development menu being used to develop a UI for configuring and controlling an application screen, generating a source script for configuring and controlling an application screen to generate a unified component independent of execution environments, upon receipt of a user input through the UI development menu, and generating a unified component independent of execution environments using the source script and a pre-installed or downloaded element source matching with a current execution environment by a component generator of a user device, upon execution of an application.

The source script may be written in a single programming language.

The single programming language may be Java Script.

The current execution environment may be a Rich Internet Application (RIA) or a HyperText Markup Language (HTML)-based Web application.

The component generator may include a component loader configured to load a component source, and an element loader configured to generate an element using the element source. The element loader may generate the unified component independent of execution environments by arranging the generated element in a component.

In accordance with another aspect of the present invention, a method for generating a UI using a unified development environment includes receiving an application execution command through a UI, receiving a source script for configuring and controlling an application screen to generate a unified component independent of execution environments by a transceiver, and generating a unified component independent of execution environments using the source script and a pre-installed or downloaded element source matching with a current execution environment by a component generator.

The source script may be written in a single programming language.

The single programming language may be Java Script.

The current execution environment may be a RIA or an HTML-based Web application.

A component source may be loaded by a component loader, and an element using the element source may be generated by an element loader. The unified component independent of execution environments may be generated by arranging the generated element in a component by the element loader.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
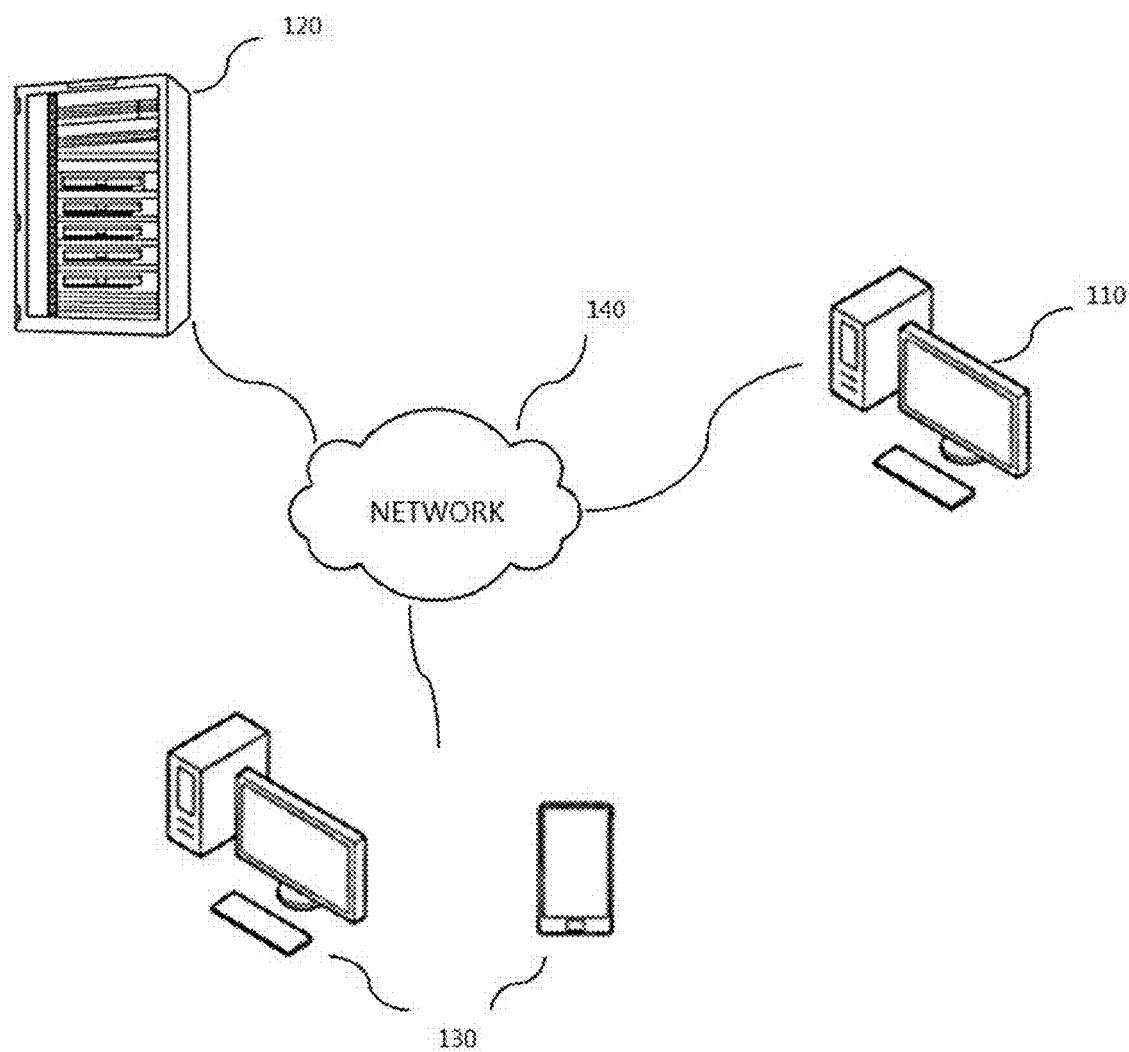
FIG. 1 illustrates a system configuration referred to for describing a method for generating a User Interface (UI) using a unified development environment according to an embodiment of the present invention.

The objectives and effects of the present invention and the technical configurations of the present invention to achieve them will be apparent with reference to embodiments of the present invention described in detail with the attached drawings. A detailed description of a generally known function and structure of the present invention will be avoided lest it should obscure the subject matter of the present invention. Although the terms used in the present invention are selected from generally known and used terms, taking into account the structures, roles, and functions of the present invention, they are subject to change depending on the intention of a user or an operator or practices.

It is to be clearly understood that the present invention may be implemented in various manners, not limited to embodiments as set forth herein. The embodiments of the present invention are provided only to render the disclosure of the present invention comprehensive and indicate the scope of the present invention to those skilled in the art. The present invention is defined only by the appended claims. Accordingly, the scope of the invention should be determined by the overall description of the specification.

Through the specification, when it is said that some part "includes" a specific element, this means that the part may further include other elements, not excluding them, unless otherwise mentioned.

Here, it can be appreciated that respective blocks of the processing flowcharts and the combinations of the flowcharts can be executed using computer program instructions. Since these computer program instructions may be installed in the processor of a multipurpose computer, a special computer or some other programmable data processing equipment, means for performing functions described in one or more flowchart blocks are created using the instructions that are executed using the processor of a computer or some other programmable data processing equipment. These computer program instructions may be stored in a computer-usable or computer-readable memory which is oriented, to a computer or some other programmable data processing equipment in order to implement functions in a specific manner. Moreover, since these computer program instructions may be installed, in a computer or some other programmable data processing equipment, a series of operational steps is performed on the computer or some other programmable data processing equipment and creates computer executable processes, so that instructions to run the computer or some other programmable data processing equipment may provide steps for performing functions that are described in flowchart blocks.

Furthermore, each block may represent part of a module, a segment or code including one or more executable instructions for executing a specific logic function. For example, two successively illustrated blocks may be actually performed at the same time or may be performed in reverse order depending on the corresponding function.

A method for generating a User Interface (UI) using a unified development environment according to an embodiment of the present invention will be described below.

In the following description, a UI refers to any of UIs displayed upon execution of an application in various execution environments. The various execution environments are environments in which the application is executed. The execution environments include, but not limited to, a Rich Internet Application (RIA) and a HyperText Markup Language (HTML)-based Web application. RIA, a Web application developed by Adobe, is an execution environment that improves a UI remarkably and increases a loading speed through database interworking with Flash. The unified development environment is a unified development tool with which an application may be developed. Thus the unified development environment is a kind of application development program with which an application executable in a plurality of execution environments may be developed.

In an embodiment of the present invention, a component is a basic unit that forms a UI and an element is a basic unit that forms a component.

FIG. 1 illustrates a system configuration referred to for describing a method for generating a UI using a unified development environment according to an embodiment of the present invention.

Referring to FIG. 1, a system 100 includes a first user device 110 in which a unified development tool is installed for a developer, a management server 120 that stores and manages a source script generated in the first user device 110, for use in generation of a UI, and a second user device 130 in which an application developed by a developer is executed. The first user device 110, the management server 120, and the second user device 130 are connected to one another via a network 140.

The first user device 110 is a device capable of developing an application. The first user device 110 includes a computer or other equipment capable of programming. A developer develops an intended UI by installing a unified development tool that provides a unified development environment in the first user device 110. The second user device 130 is a device in which an application developed by a developer is installed and executed. For example, the second user device 130 may be a desktop Personal Computer (PC), a laptop PC, a smart phone, or a tablet PC.

The network 140 is a wired/wireless network over which data may be transmitted and received.

Figure 2:
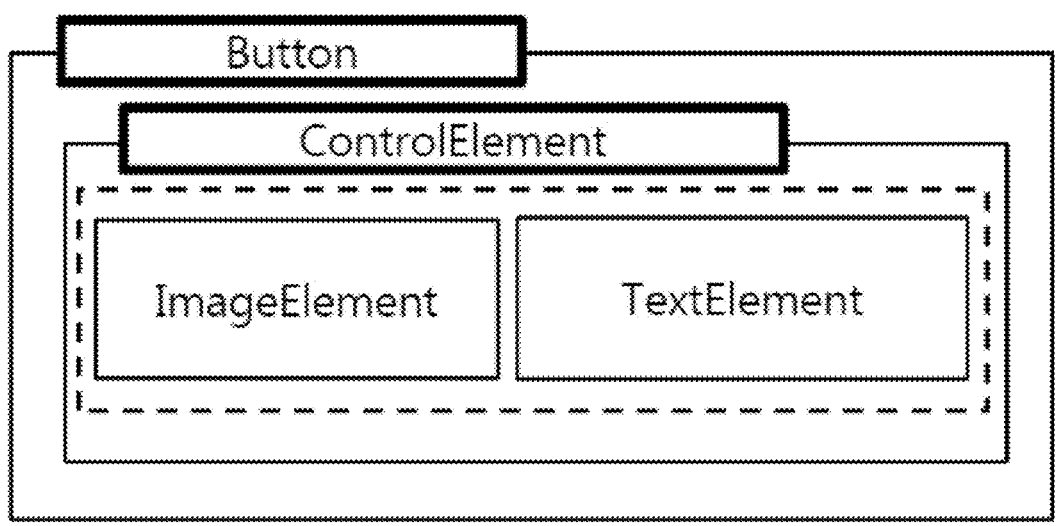
FIGS. 2, 3 and 4 illustrate exemplary components each including elements in the method for generating a UI using a unified development environment according to the embodiment of the present invention.
Figure 3:
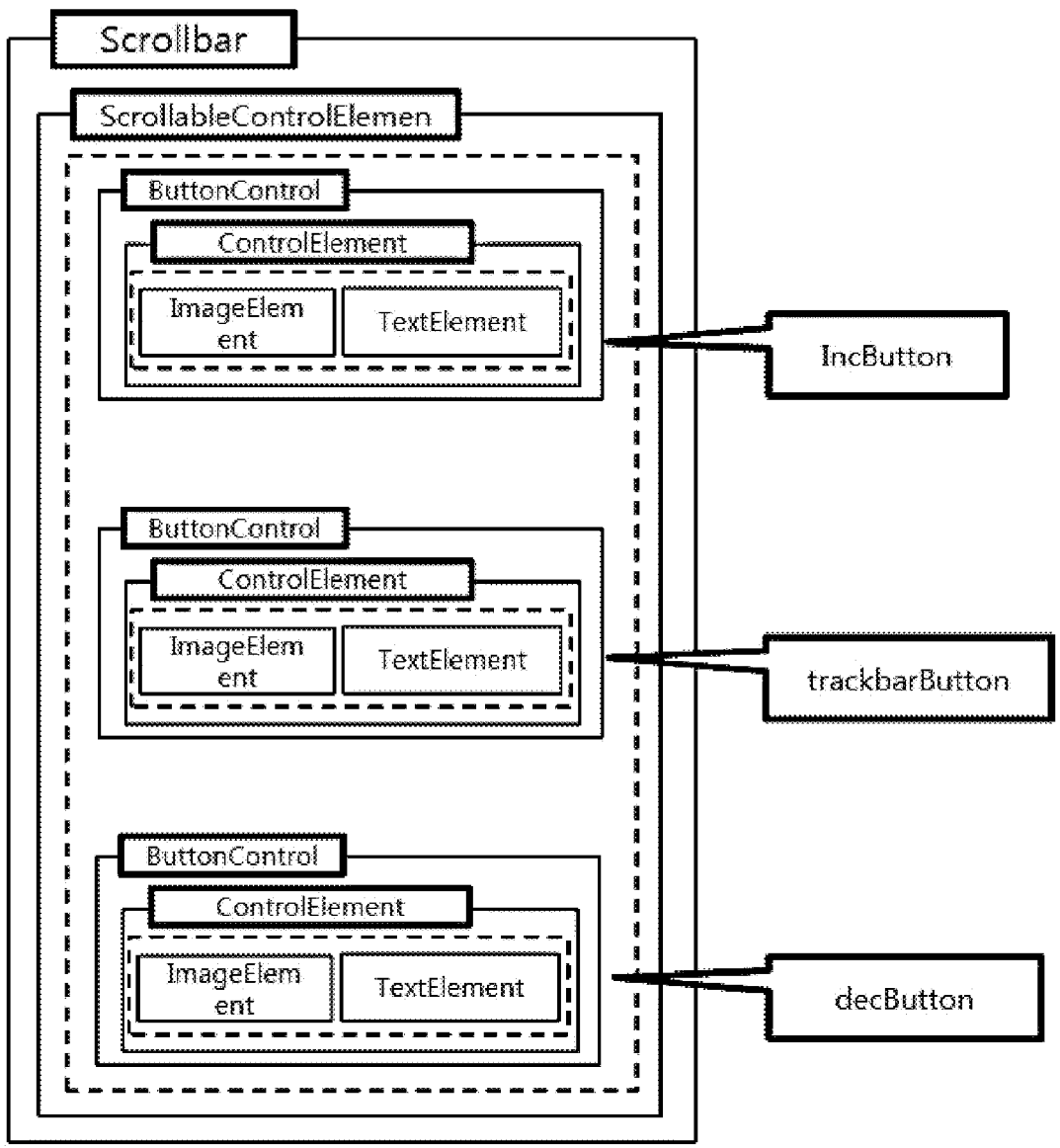
Figure 4:
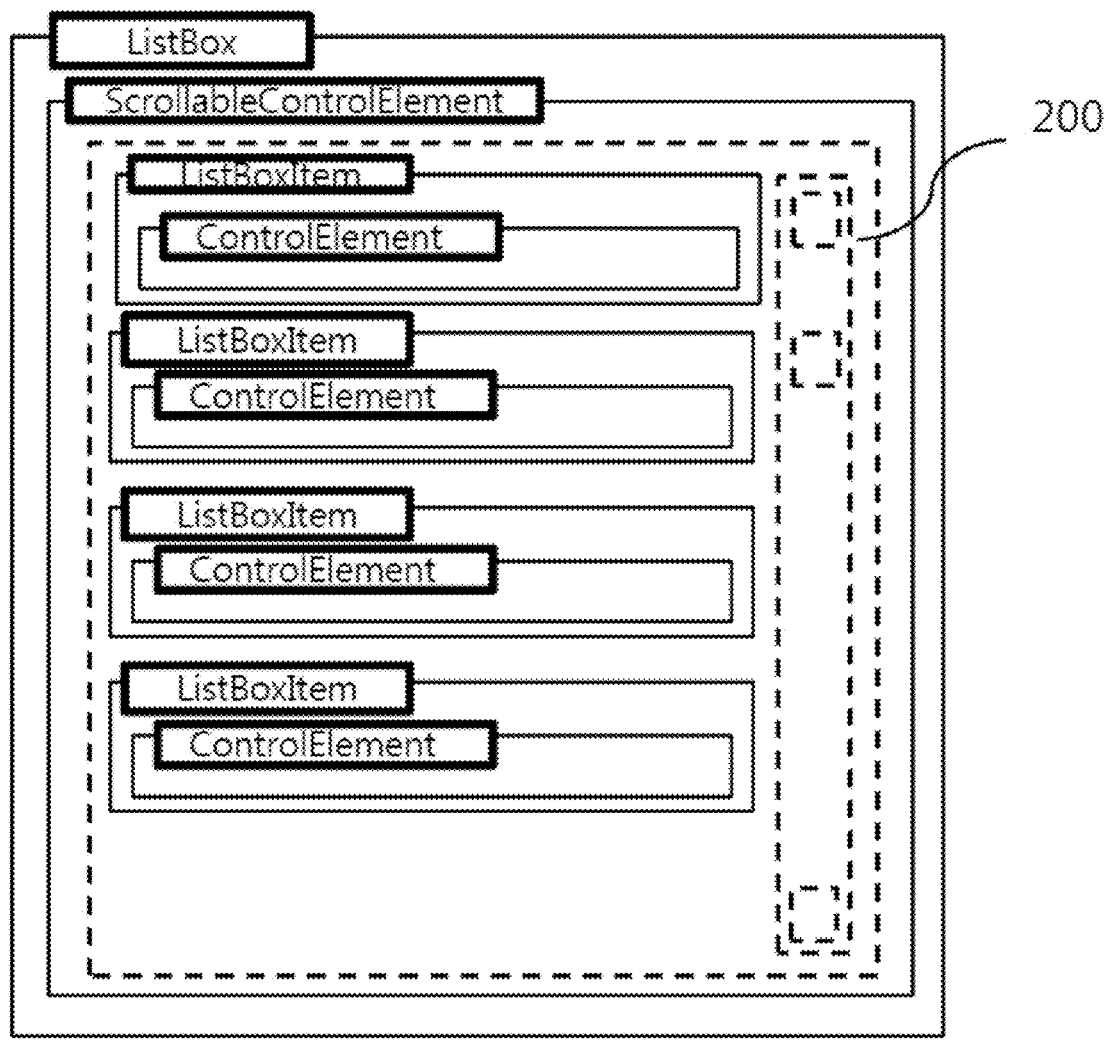

FIGS. 2, 3 and 4 illustrate exemplary components each including elements in the method of generating a UI using a unified development environment according to the embodiment of the present invention.

FIG. 2 illustrates a button component. The button component is configured to include a control element, a text element, and an image element.

The text element has a text display function and the image element has an image viewer function. The control element has a container function to contain another element with a border and a background.

FIG. 3 illustrates a scrollbar component. The scrollbar component includes a button component with a text element, an image element, and a control element, and a scrollable control element that has a scroll function in addition to the same function of the control element.

FIG. 4 illustrates a list box component. The list box component includes a plurality of list box item components each having a control element, a scrollable control element that provides a scroll function to the list box item components, and a scrollbar component 200 illustrated in FIG. 3. The list box component illustrated in FIG. 4 is configured to include the scrollbar component 200 inside.

As illustrated in FIGS. 3 and 4, a component may be configured to include only an element or, when needed, another component.

In the case where a component is developed for each execution environment, when the component is to be modified or supplemented, the component should be modified or supplemented for individual execution environments.

Accordingly, an embodiment of the present invention provides a method for generating a UI using a unified development environment, which enables generation of a unified component independent of execution environments, so that the unified component may be executed in every execution environment just by one modification and supplementation.

The method for generating a UI using a unified development environment according to the embodiment of the present invention will be described in greater detail.

Figure 5:
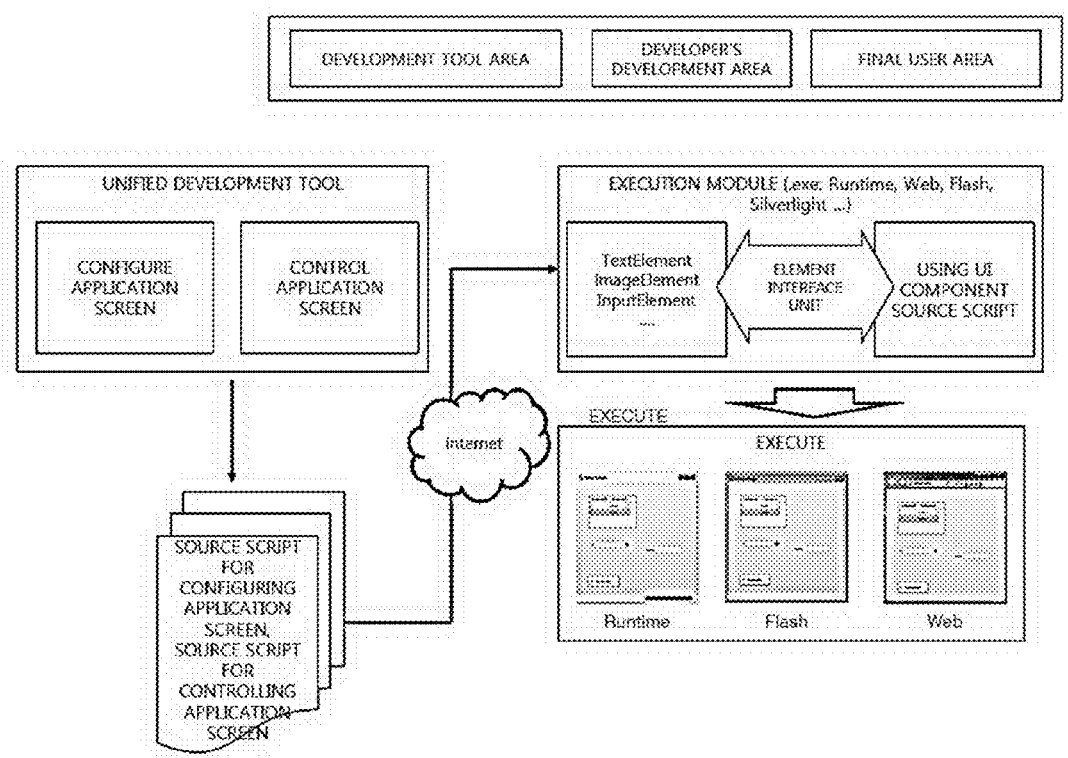
FIG. 5 is a block diagram illustrating the method for generating a UI using a unified development environment according to the embodiment of the present invention.

FIG. 5 is a block diagram illustrating the method of generating a UI using a unified development environment according to the embodiment of the present invention.

Referring to FIG. 5, an application developer may develop an application by installing a unified development tool program in the first user device 110. When the developer develops an application using the unified development tool, a source script for configuring or controlling an application screen may be created. The source script may be generated in a single programming language. The source script may be stored in the management server 120 that provides a service. Upon execution of the application in the second user device 130, the source script may be transmitted to the second user device 130 through the network 140.

An execution module of the developed application may be installed in advance in the second user device 130. The execution module may be provided to the developer in a package with the unified development tool. The execution module corresponds to an execution file in an execution environment such as Runtime, Web, Flash, or Silverlight. An element source matching with an execution environment may be downloaded to the second user device 130, upon execution of the execution module or may be installed in advance in the second user device 130.

When a user executes the application developed by the developer in the second device 110, the execution module operates. The execution module generates a unified component by generating an element using the source script and the element source matching with the current execution environment and arranging the element in a unified component.

In the embodiment of the present invention, a unified component independent of execution environments can be generated by providing a source script with which to generate the unified component independent of execution environments and providing an element source matching with a current execution environment.

Figure 6:
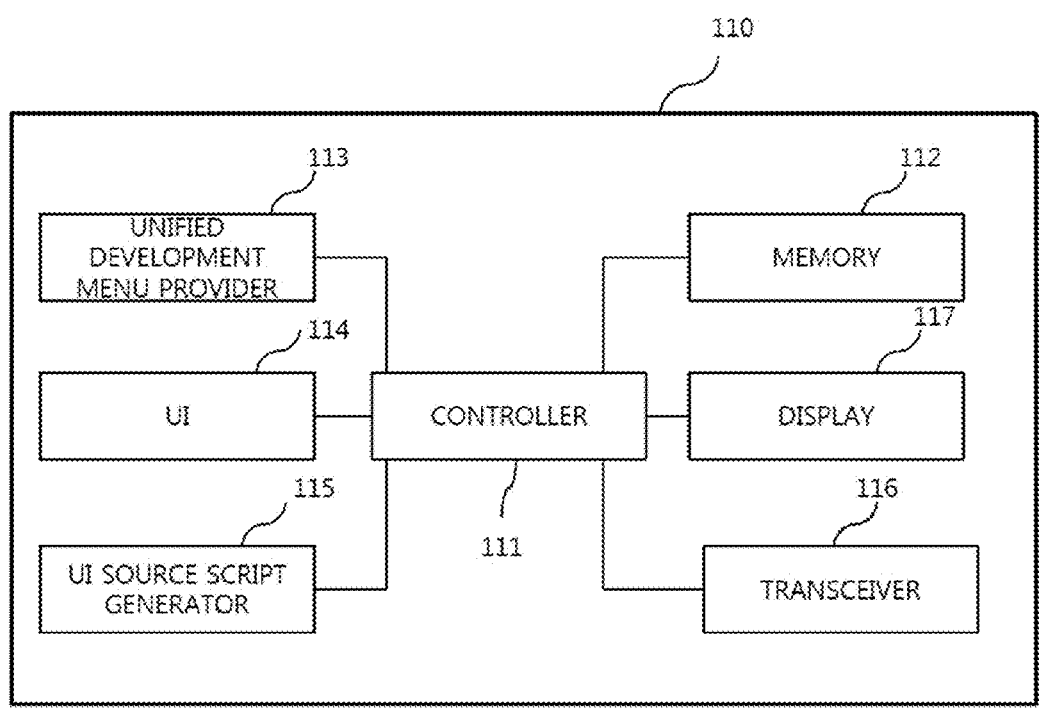
FIG. 6 is a block diagram of a first user device in which a unified development tool is installed in the method for generating a UI using a unified development environment according to the embodiment of the present invention.

FIG. 6 is a block diagram of the first user device 110 in which a unified development tool is installed in the method of generating a UI using a unified development environment according to the embodiment of the present invention.

Referring to FIG. 6, the first user device 100 includes a controller 111 that providers overall control and management to the user device 110, a memory 112 that stores an operation program and an application program, a unified development menu provider 113 that provides a development menu to a developer in a unified development tool for developing an application, a UI 114 through which data is received, a UI source script generator 115 that generates a source script to configure a UI using an input received through the unified development menu provider 113, a transceiver 116 having a communication function to transmit and receive data through a network, and a display 117 that outputs various types of information.

Figure 7:
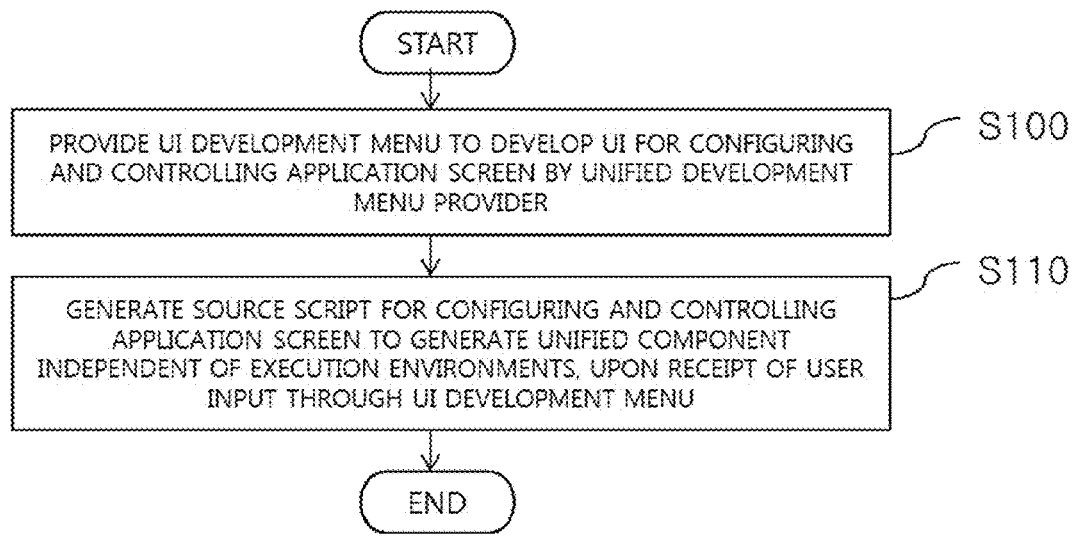
FIG. 7 is a flowchart illustrating a method for developing an application in the method for generating a UI using a unified development environment according to the embodiment of the present invention.

FIG. 7 is a flowchart illustrating a method for developing an application in the method of generating a UI using a unified development environment according to the embodiment of the present invention.

To implement the method for generating a UI using a unified development environment according to the embodiment of the present invention, a unified development tool is installed in the first user device 110 of a developer, for application development.

Upon execution of the unified development tool in the first user device 110, the unified development menu provider 113 provides a UI development menu for configuring and controlling an application screen on the display 117 (S100).

When the developer selects an intended menu item in the UI development menu and enters a required command according to a development manual through the UI 114, the UI source script generator 115 generates a source script for configuring and controlling an application screen to generate a unified component independent of execution environments (S110).

The source script may be generated in a single programming language, for example, Java Script. That is, since the unified development tool generates a source script in a single programming language, the developer does not need to learn various programming languages.

The source script is transmitted to the management server 120 and then to the second user device 130 of a user that executes an application corresponding to the source script through the network 140.

Upon execution of the application, a component generator 132 of the second user device 130 generates a unified component independent of execution environments using the source script and an element source matching with a current execution environment, which is installed in the second user device 130 in advance or downloaded to the second user device 130 upon execution of the application.

Figure 8:
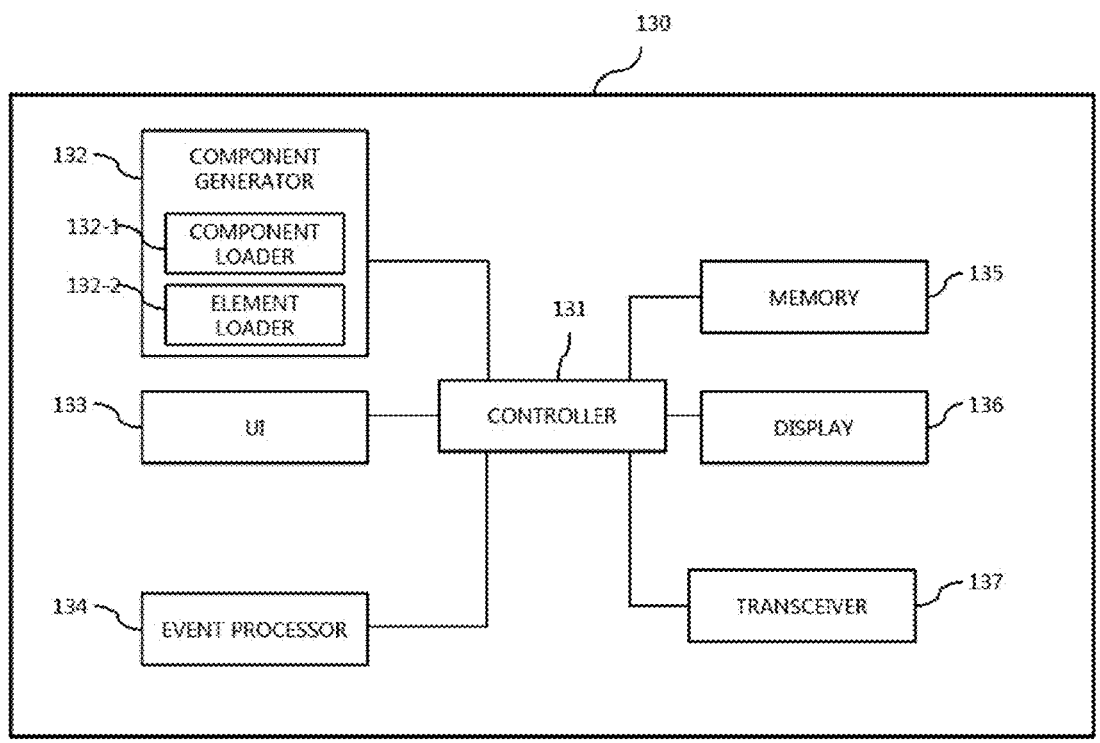
FIG. 8 is a block diagram of a second user device in the method for generating a UI using a unified development environment according to the embodiment of the present invention.

FIG. 8 is a block diagram of the second user device 130 in the method of generating a UI using a unified development environment according to the embodiment of the present invention.

Referring to FIG. 8, the second user device 130 includes a controller 131 that provides overall control to the second user device 130, the component generator 132 that generates a unified component independent of execution environments using a source script and an element source, a UI 133 that receives data, an event processor 134 that processes an event on a component basis according to a user command received through the UI 133, a memory 135 that stores an operation program and an application program, a transceiver 136 having a communication function to transmit or receive data over a network, and a display 137 that outputs various types of information.

The component generator 132 includes a component loader 132-1 that loads a component source based on a source script and an element loader 132-2 that generates an element using an element source and arranges the generated element in a component.

Figure 9:
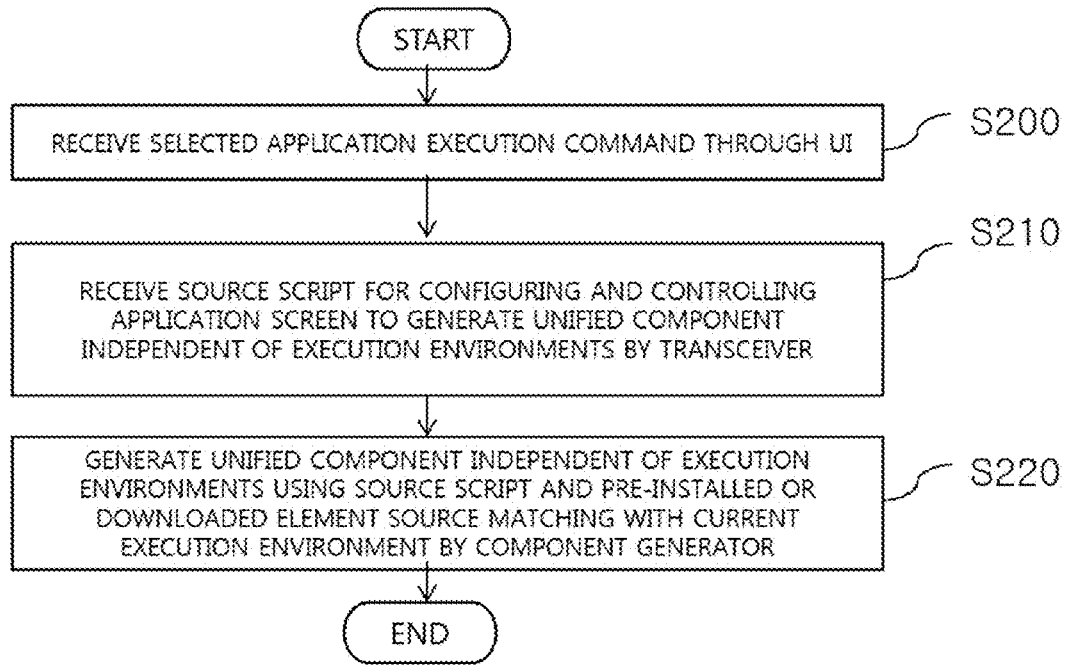
FIG. 9 is a flowchart illustrating an operation of the second user device in the method for generating a UI using a unified development environment according to the embodiment of the present invention.

FIG. 9 is a flowchart illustrating an operation of the second user device 130 in the method of generating a UI using a unified development environment according to the embodiment of the present invention.

Referring to FIG. 9, the second user device 130 receives an application execution command through the UI 133 (S200). Then the transceiver 137 receives a source script for controlling and configuring a UI screen to generate a unified component independent of execution environments (S210). The component generator 132 generates a unified component independent of execution environments using the source script and a pre-installed or downloaded element source matching with a current execution environment (S220).

Specifically, the component loader 132-1 loads a component source using the received source script. The element loader 132-2 checks an element of the component source based on the loaded component source, generates an element by loading an element source pre-installed in the second user device 130 or downloaded upon execution of an application, and arranges the generated element in a component, thereby generating a unified component independent of execution environments.

Since a source script written in a single programming language, for use in generating a unified component independent of execution environments, and an element source matching with an execution environment are provided separately in this manner, a unified component independent of execution environments can be provided.

As is apparent from the above description of the method for generating a UI using a unified development environment, an application executable in various execution environments can be developed using a unified development environment without the need of various application development tools matching with various execution environments, the development cost of the application can be reduced remarkably.

When the application is to be modified or supplemented, the application can be modified or supplemented in a unified manner without modifying the application for various individual execution environments. Therefore, the management cost of the application can be reduced significantly.

The method for generating a UI using a unified development environment according to the embodiment of the present invention may be written as a program that can be executed by a computer and may be implemented in a general-purpose digital computer that can execute the program using a computer-readable recording medium. Examples of the computer-readable recording medium include magnetic media such as a hard disk a floppy disk, and a magnetic tape, optical media such as a CD ROM and a DVD, magneto-optical media such as a floptical disk, and hardware devices specially configured to store and perform a program command, such as a ROM, a RAM, and a flash memory. The program command includes a premium language code executable in a computer by means of an interpreter as well as a mechanical code as written by a compiler.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for generating a User Interface (UI) using a unified development environment, the method comprising:
   providing, at a first user device, a UI development menu by a unified development menu provider, the UI development menu usable to develop a UI for configuring and controlling an application screen of a second user device;
   generating, at the first user device, upon receipt of a user input through the UI development menu, a source script that configures and controls the application screen of the second user device to generate a unified UI component at the second user device independent of an execution environment operating on the second user device; and
   providing a component generator at the second user device;
   at the second user device and after receiving an application execution command at the second user device through the UI operating on the second user device, receiving via a transceiver of the second user device, the source script, generated at the first user device, for configuring and controlling an application screen of an application operating on the second user device; and
   upon execution of the application at the second user device, generating the unified UI component at the second user device for display on the application screen of the second user device after receiving the source script from the first user device, wherein the component generator uses both of i) a pre-installed or downloaded element source that matches an execution environment in use at the second user device, and ii) the source script to generate the unified UI component at the second user device.

2. The method according to claim 1, wherein the source script is written in a single programming language.

3. The method according to claim 2, wherein the single programming language is JavaScript.

4. The method according to claim 1, wherein the execution environment operating on the second user device is a Rich Internet Application (RIA) or a HyperText Markup Language (HTML)-based Web application.

5. The method according to claim 1, wherein the component generator comprises:
   a component loader configured to load a component source based on the source script; and
   an element loader configured to generate an element using the element source,
   wherein the element loader generates the unified component by arranging the generated element in a component.

6. The method according to claim 1,
   wherein the component generator comprises a component loader and an element loader,
   wherein the component loader loads a UI component source based on the source script,
   wherein the element loader checks an element of the UI component source and generates the element from the element source, and
   wherein the element loader generates the unified component by arranging the generated element in a UI component.

7. A system for generating a User Interface (UI), the system including a first user computer device and a second user computer device that both comprise a processor device and a memory, and the system configured being to perform the functions of:
  providing, at the first user computer device, a UI development menu by a unified development menu provider, the UI development menu usable to develop a UI for configuring and controlling an application screen of the second user computer device;
  generating, at the first user computer device, upon receipt of a user input through the UI development menu, a source script that configures and controls the application screen of the second user computer device to generate a unified UI component at the second user computer device independent of an execution environment operating on the second user computer device, and
  providing a component generator at the second user computer device; and
  at the second user computer device, receiving an application execution command through the UI operating on the second user computer device;
  at the second user computer device and after receiving the application execution command, receiving via a transceiver of the second user computer device, the source script, generated at the first user computer device, for configuring and controlling an application screen of an application operating on the second user computer device; and
  at the second user computer device and after receiving the source script from the first user computer device, generating, via a component generator operating on the second user computer device, a unified UI component, the component generator using both i) the received source script to generate the unified UI component at the second user device, and ii) a pre-installed or downloaded element source matching with an execution environment in use on the second user computer device to generate the unified UI component.

8. The system according to claim 7, wherein the source script is written in a single programming language.

9. The system according to claim 8, wherein the single programming language is JavaScript.

10. The system according to claim 7, wherein the execution environment at the second user computer device is a Rich Internet Application (RIA) or a HyperText Markup Language (HTML)-based Web application.

11. The system according to claim 7,
  wherein a component loader of the component generator loads a component source using the source script,
  wherein an element loader of the component generator checks an element of the component source and generates the element from the element source, and
  wherein the unified component is generated by the element loader arranging the generated second element in a UI component.

12. The system according to claim 7, wherein, after receiving the application execution command, the element source is downloaded to the user computer device.

13. A non-transitory computer-readable recording medium having stored thereon computer-executable code forming a program that, upon execution by a computer device, causes the computer device to perform the method according to claim 1.

14. A non-transitory computer-readable recording medium having stored thereon computer-executable code forming a program that, upon execution by a computer device, causes the computer device to perform in accordance with the system recited by claim 11.

* * * * *